United States Patent
Tsutsumi (10) Patent No.: US 7,798,439 B2
(45) Date of Patent: Sep. 21, 2010

(54) FISHING REEL

(75) Inventor: Wataru Tsutsumi, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 12/401,449

(22) Filed: Mar. 10, 2009

(65) Prior Publication Data

US 2009/0250541 A1    Oct. 8, 2009

(30) Foreign Application Priority Data

| Apr. 8, 2008 | (JP) | ............................. 2008-100200 |
| Apr. 8, 2008 | (JP) | ............................. 2008-100201 |
| May 21, 2008 | (JP) | ............................. 2008-132906 |
| May 27, 2008 | (JP) | ............................. 2008-138085 |

(51) Int. Cl.
*A01K 89/00* (2006.01)
*A01K 89/015* (2006.01)

(52) U.S. Cl. ........................ 242/257; 242/273; 242/274; 242/295; 242/311

(58) Field of Classification Search ................. 242/228, 242/241, 273, 274, 249, 257, 295, 299, 259–262, 242/265, 275–280

See application file for complete search history.

(56) References Cited

U.S. PATENT DOCUMENTS

| 4,640,470 | A | * | 2/1987 | Ohler | ........................... 242/238 |
| 4,850,548 | A | * | 7/1989 | Faulkner | ..................... 242/256 |
| 4,905,930 | A | * | 3/1990 | Puryear et al. | ............... 242/312 |
| 5,222,995 | A | * | 6/1993 | Sato | ............................. 242/258 |
| 5,350,133 | A | * | 9/1994 | Morimoto | .................... 242/261 |
| 5,772,139 | A | * | 6/1998 | Sato | ............................. 242/261 |
| 5,775,614 | A | * | 7/1998 | Yamaguchi | .................. 242/261 |
| 5,921,490 | A | * | 7/1999 | Sato | ............................. 242/261 |
| 6,598,817 | B2 | * | 7/2003 | Kitajima et al. | .............. 242/257 |
| 7,216,825 | B2 | * | 5/2007 | Oishi et al. | .................. 242/247 |
| 7,290,727 | B1 | * | 11/2007 | Matsuda | ...................... 242/238 |
| 7,374,118 | B2 | * | 5/2008 | Oishi et al. | .................. 242/257 |
| 7,464,891 | B2 | * | 12/2008 | Bao-Coutado | .............. 242/317 |
| 2004/0144876 | A1 | * | 7/2004 | Oishi et al. | .................. 242/257 |
| 2006/0180691 | A1 | * | 8/2006 | Oishi et al. | .................. 242/257 |

FOREIGN PATENT DOCUMENTS

| JP | 2-81173 U | 6/1990 |
| JP | 3403618 B2 | 2/2003 |

* cited by examiner

*Primary Examiner*—Evan H Langdon
(74) *Attorney, Agent, or Firm*—Sughrue Mion, PLLC (57) ABSTRACT

A fishing reel includes: a reel body including left and right side plates; a spool for winding a fishing line, rotatably supported between the left and right side plates; a handle for rotating the spool; a fishing line guiding device. A fishing line guiding device includes: a slider body which is mounted between the left and right side plates on a front of the spool and is reciprocated left and right by a winding operation of the handle; a swinging body including one end portion rotatably supported by the body and the other end provided with a line guide for guiding the fishing line; and a coupling portion which couples the swinging body to the slider body so that the swinging body reciprocates the line guide arcuately left and right.

5 Claims, 9 Drawing Sheets

FISHING REEL

BACKGROUND OF THE INVENTION

The present invention relates to a fishing reel in which a fishing line guiding device (also referred to as a level-wind device) for guiding the winding of a fishing line in parallel around a spool is provided between side plates in front of the spool.

In general, with the fishing reel of the above-described type, if a winding operation of a handle is performed, a line guide of a fishing line guiding device installed in front of a spool reciprocates left and right. Since the line guide is formed as an elongated hole or a round hole to allow the fishing line to be inserted therethrough, if the line guide reciprocates left and right in conjunction with the winding operation of the handle, the fishing line is wound in parallel to the rotating spool.

During the releasing operation of the fishing line, the fishing line which is paid out from the spool is released forward through the line guide while moving in the left-right direction and bulging upward, so that there is a problem in that the casting distance decreases due to the effect of the contact resistance produced between the fishing line and the line guide.

Accordingly, to solve such a problem, Japanese Patent No. 3403618 discloses a structure in which the line guide includes a fishing line inserting portion which is upwardly open and a pair of horizontal fishing line guiding portions respectively provided so as to extend outward, and end portions of the horizontal fishing line guiding portions are respectively fitted in arcuate fitting holes formed in side plates.

According to the line guide of such a structure, since the upper side of the fishing line inserting portion is open, the contact resistance with the fishing line bulging upward from the spool can be alleviated during the releasing of the fishing line, thereby making it possible to prevent a decrease in the casting distance.

In the fishing line guiding device of the fishing reel disclosed in the above-described Japanese Patent No. 3403618, the structure provided is such that a slider body which reciprocates left and right is provided between left and right side plates on the rear side of the spool, and a transmission rod is coupled to this slider body. The transmission rod extends from the rear side of the spool toward the front side on the lower side of the spool, and a central portion thereof is rotatably supported by a lower portion (leg portion) of a reel body.

Namely, since the structure provided is such that a rear-side end portion of the transmission rod is coupled to the slider body on the rear side of the spool, and a front-side end portion thereof is secured to the aforementioned line guide on the front side of the spool, a clutch changeover member cannot be disposed between the side plates in the rear of the spool. Hence, there is a problem in that the line releasing operation which involves the thumbing operation after turning the clutch off cannot be performed easily.

In addition, since the transmission rod of the fishing line guiding device is mounted on the lower side of the spool of the reel body, and the line guide and the slider body are mounted in a distributed manner in the front-back direction of the spool, there is a problem in that the reel body becomes large in size.

SUMMARY OF THE INVENTION

The invention has been devised by paying attention to the above-described problems, and its object is to provide a fishing reel having a fishing line guiding device which excels in the operability at the time of releasing the fishing line and is capable of attaining a reduction in size of the reel body.

In order to achieve the invention, the present invention provides the following arrangements.

(1) A fishing reel comprising:
  a reel body including left and right side plates;
  a spool for winding a fishing line, rotatably supported between the left and right side plates;
  a handle for rotating the spool;
  a fishing line guiding device which includes:
  a slider body which is mounted between the left and right side plates on a front of the spool and is reciprocated left and right by a winding operation of the handle;
  a swinging body including one end portion rotatably supported by the body and the other end provided with a line guide for guiding the fishing line; and
  a coupling portion which couples the swinging body to the slider body so that the swinging body reciprocates the line guide arcuately left and right.

(2) The fishing reel according to (1), wherein the line guide includes a V-shaped line guide portion having an upwardly-facing opening, and a pair of engaging portions which respectively extend from opposite upper outer sides of the line guide portion and whose respective distal ends are movably engaged with the left and right side plates.

(3) The fishing reel according to (2), wherein
  a pair of elongated grooves are respectively formed on the left and right side plates of the reel body in such a manner as to extend along a releasing direction of the fishing line, the pair of engaging portions of the line guide being respectively engaged with the pair of elongated grooves, and
  the pair of engaging portions are supported by the pair of elongated grooves and are respectively moved in opposite directions in the releasing direction when the swinging body is swung.

(4) The fishing reel according to (2), wherein
  a clutch changeover member which is capable of opening or closing when performing a clutch changeover operation is supported above a space between the left and right side plates, and
  the clutch changeover member opens the opening of the line guide portion when a clutch is disengaged and covers the opening of the line guide portion when the clutch is engaged.

(5) A fishing reel comprising:
  a reel body including left and right side plates;
  a spool for winding a fishing line, rotatably supported between the left and right side plates;
  a handle for rotating the spool;
  a clutch mechanism which transmits rotation power of the handle to the spool;
  a clutch changeover member which is integrally formed with a disengagement operation portion for disengaging the clutch mechanism from the spool, and an engagement operation portion for engaging the clutch mechanism with the spool,
  wherein the engagement operation portion covers an upper surface of at least one of the left and right side plates and is movably supported by the reel body.

(6) The fishing reel according to (5), wherein
  the clutch changeover member is disposed along the upper surfaces of the left and right side plates, and
  the clutch changeover member is rotatably supported by the reel body so that an operating direction of the engagement operation portion is opposite to an operating direction of the disengagement operation portion.

(7) The fishing reel according to (5), wherein the engagement operation portion bridges the left and right side plates.

According to the above-described structure, since the slider body which is reciprocated between the left and right side plates and the line guide for guiding the fishing line, both of which constitute the fishing line guiding device, are disposed on the front side of the spool, it becomes possible to make effective use of the space between the side plates in the rear of the spool as a zone for the clutch changeover operation and a thumbing zone. Hence, it becomes possible to improve the operability at the time of releasing the fishing line. In addition, since the structure provided is not like the above-described conventional structure in which the slider body and the line guide are distributed to the front and the rear of the spool, it becomes possible to attain a reduction in size of the reel body.

According to the invention, it is possible to obtain a fishing reel having a fishing line guiding device which excels in the operability at the time of releasing the fishing line and is capable of attaining a reduction in size of the reel body.

DETAILED DESCRIPTION OF PREFERRED EMBODIMENTS

Referring now to the drawings, a detailed description will be given of an embodiment of the fishing reel in accordance with the invention.

Figure 1:
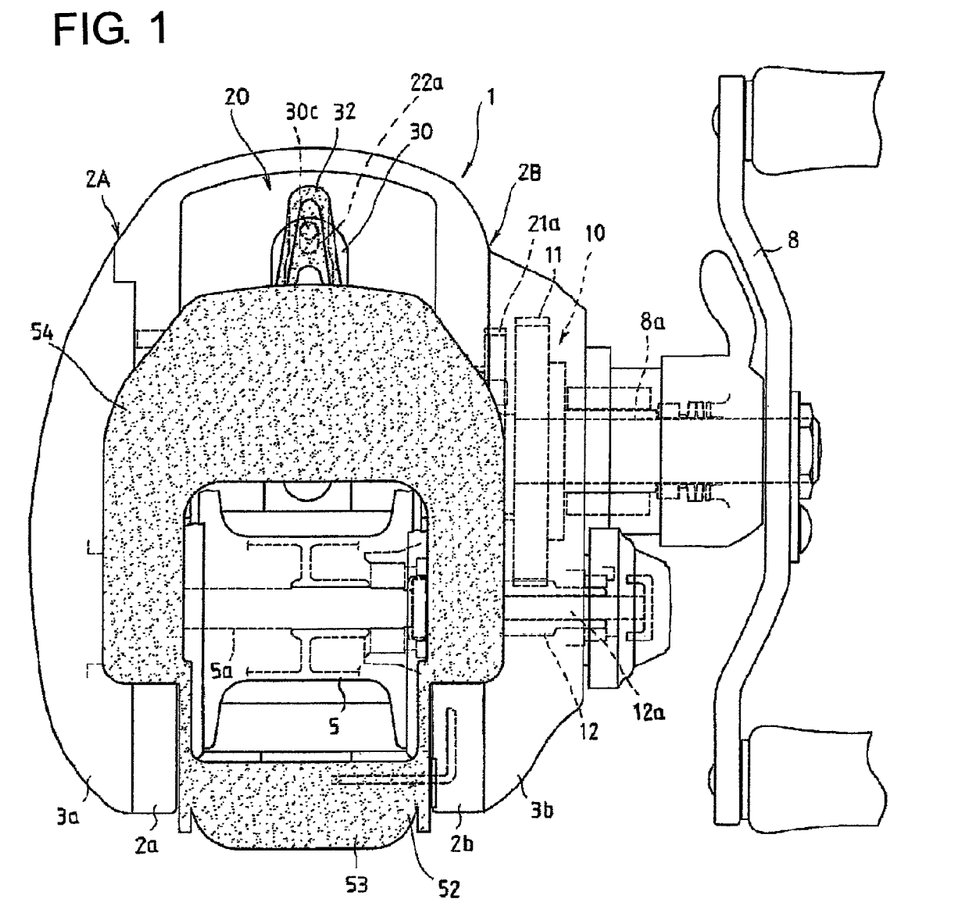
FIG. 1 is a plan view illustrating a first embodiment of a fishing reel in accordance with the invention.
Figure 2:
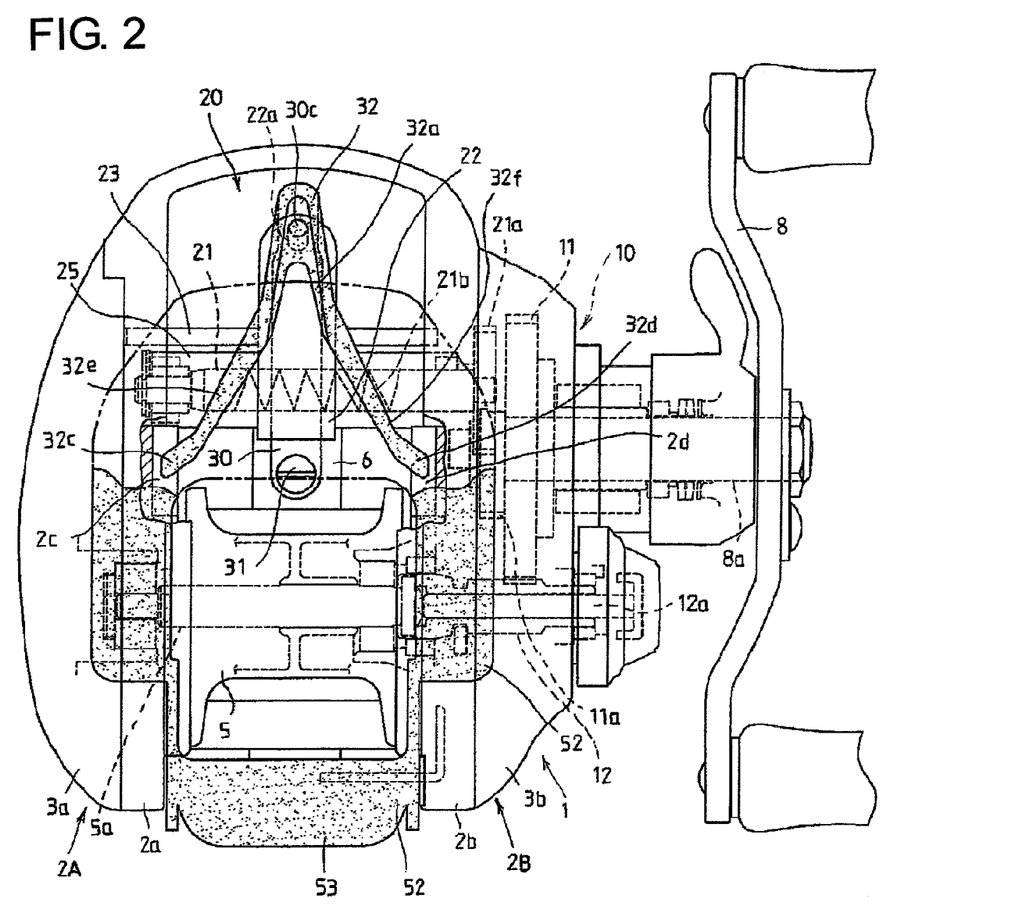
FIG. 2 is a plan view illustrating the structure of a line guide of a fishing line guiding device.
Figure 3:
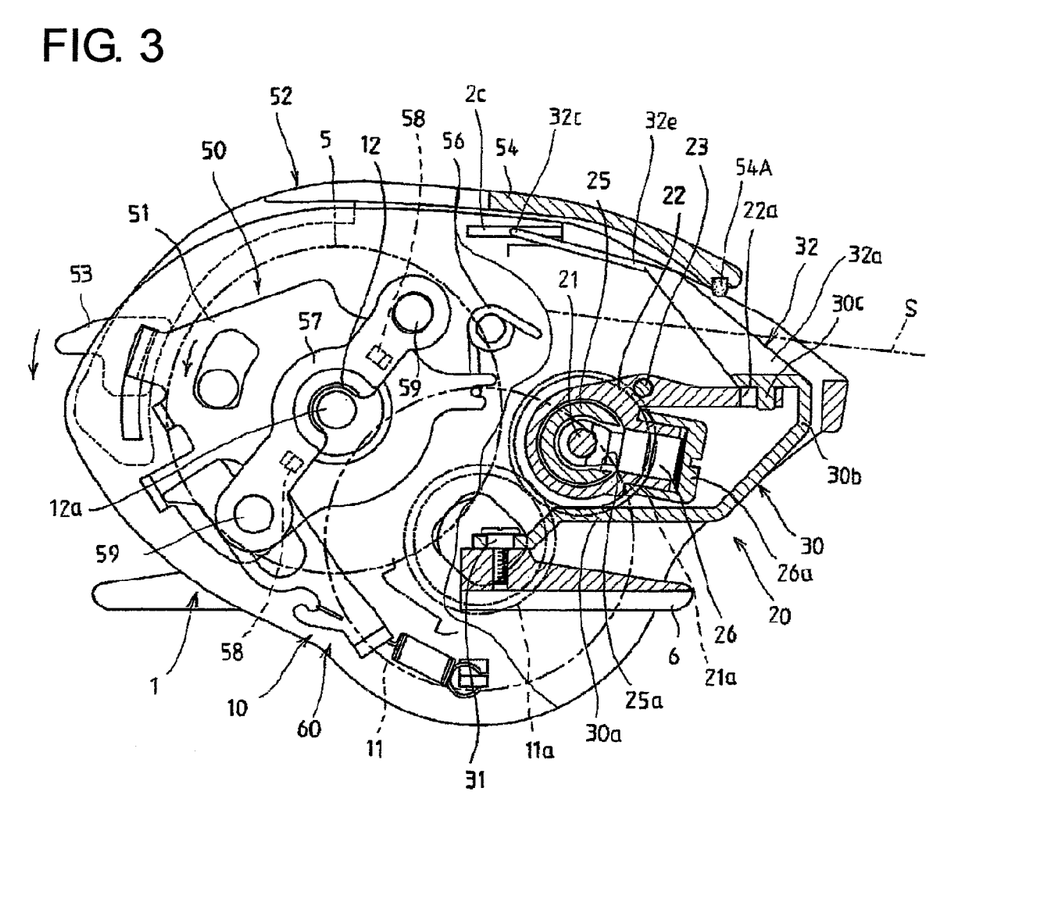
FIG. 3 is a side elevational view of a reel body and is a diagram illustrating a schematic structure of a clutch mechanism and the fishing line guiding device (clutch ON state)
Figure 4:
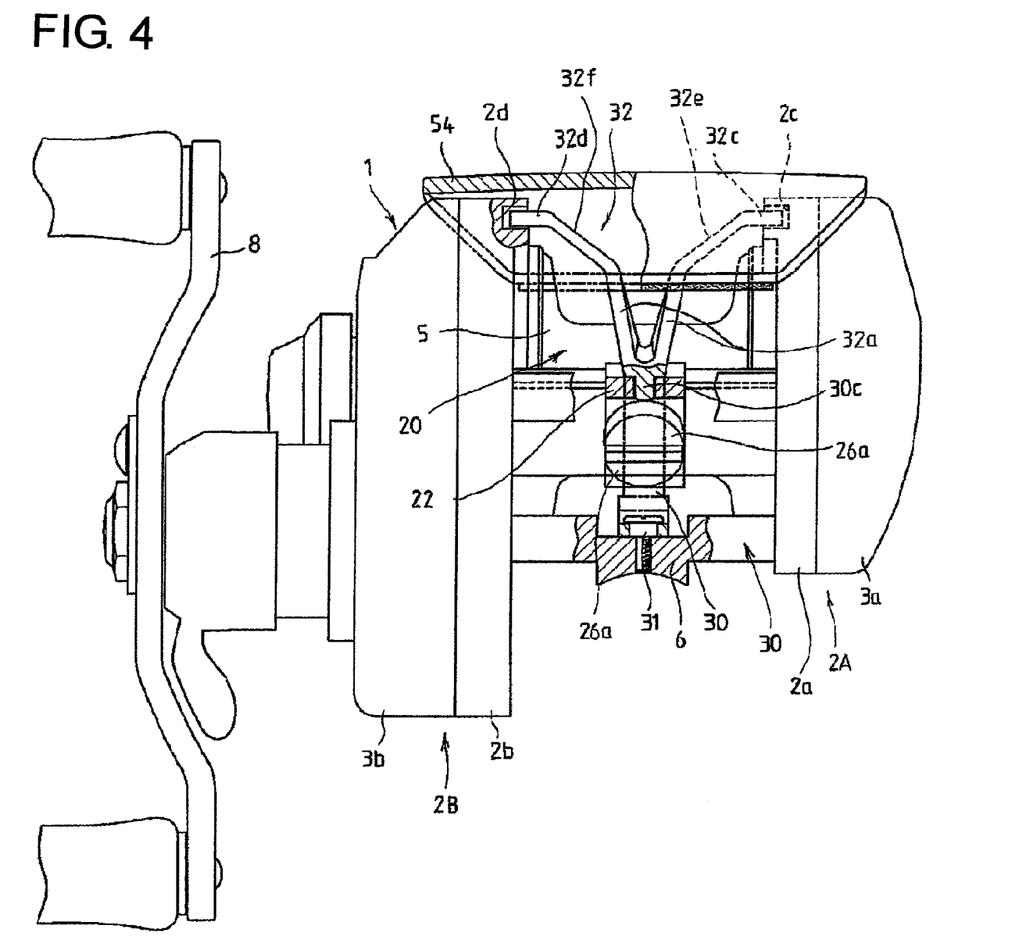
FIG. 4 is a front elevational view of the reel body.
Figure 5:
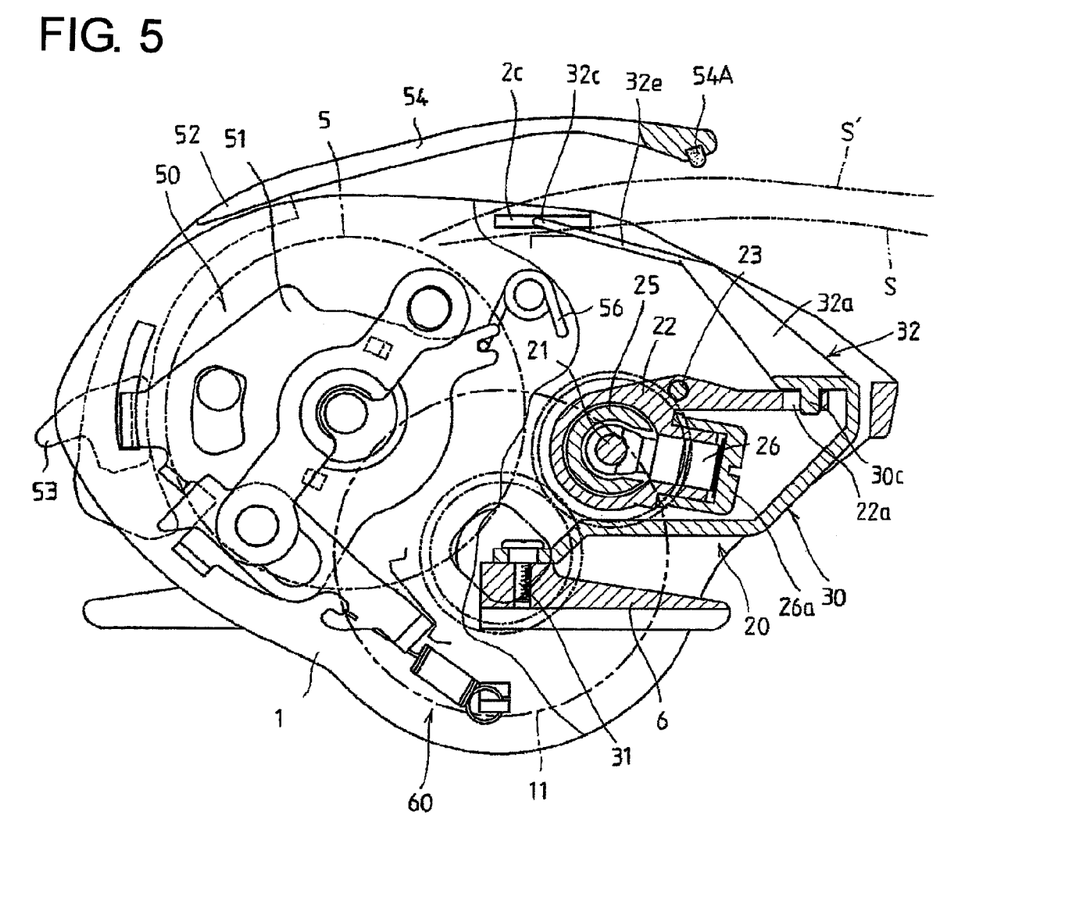
FIG. 5 is a side elevational view of the reel body illustrating a clutch OFF state.
Figure 6:
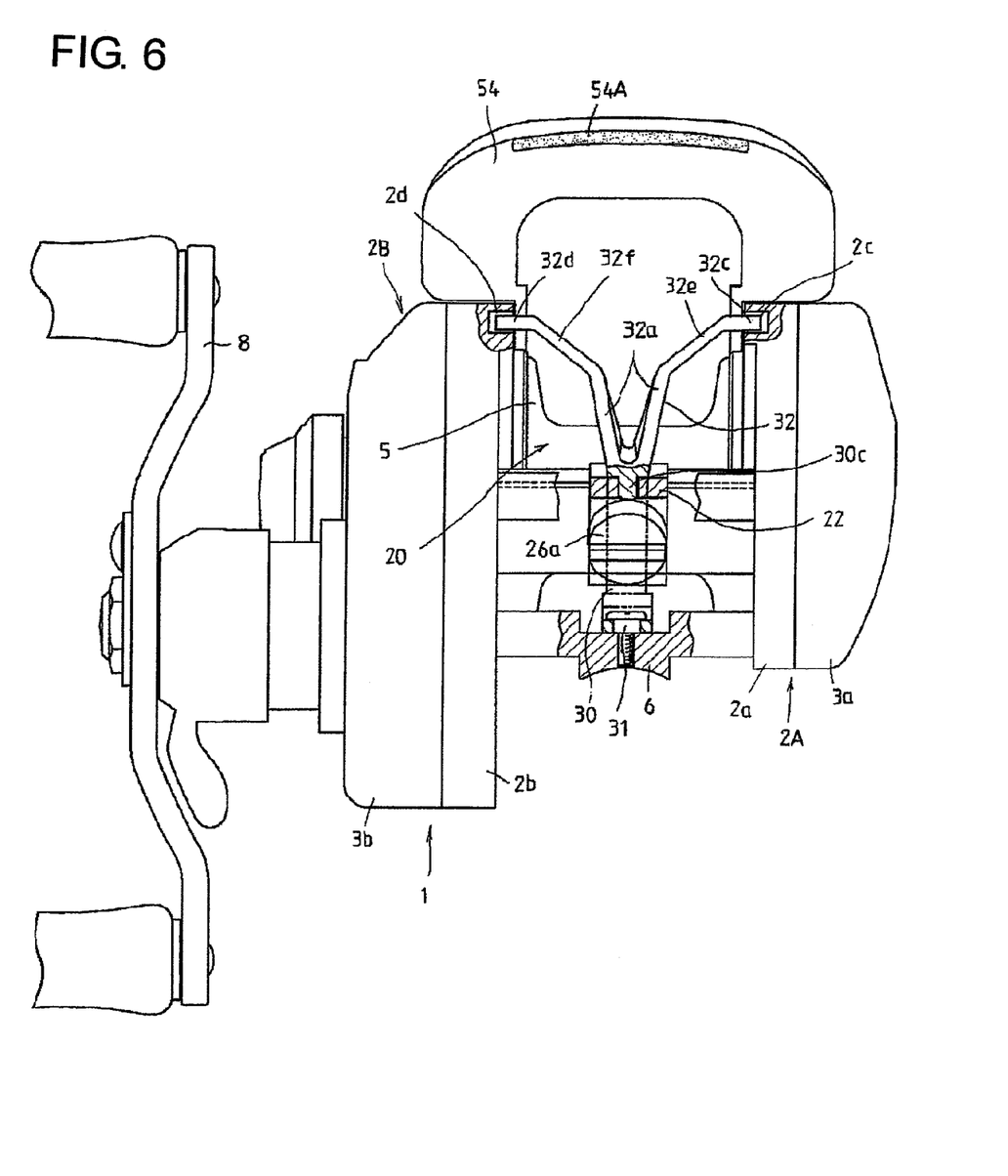
FIG. 6 is a front elevational view of the reel body illustrating the clutch OFF state.
Figure 7:
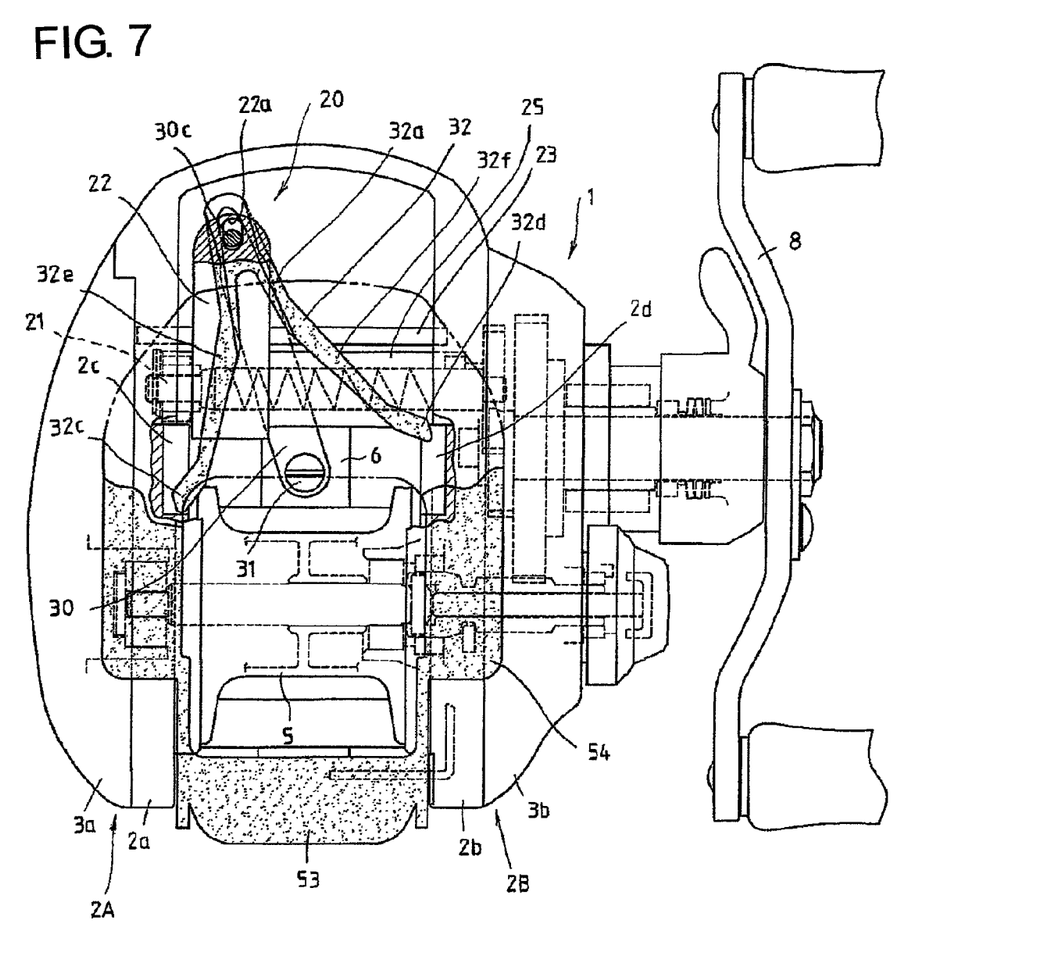
FIG. 7 is a plan view illustrating a swung state of the line guide.

FIGS. 1 to 7 are diagrams illustrating a first embodiment of the fishing reel in accordance with the invention. FIG. 1 is a plan view of a reel body; FIG. 2 is a plan view illustrating the structure of a line guide of a fishing line guiding device; FIG. 3 is aside elevational view of the reel body and is a diagram illustrating a schematic structure of a clutch mechanism and the fishing line guiding device (clutch ON state); FIG. 4 is a front elevational view of the reel body; FIG. 5 is a side elevational view of the reel body illustrating a clutch OFF state; FIG. 6 is a front elevational view of the reel body illustrating the clutch OFF state; and FIG. 7 is a plan view illustrating a swung state of the line guide.

As shown in FIG. 1, a reel body 1 of a fishing reel has left and right side plates 2A and 2B which rotatably support a spool 5 around which a fishing line is wound. Here, structural bodies located on both end sides of the spool 5 correspond to the "side plates." In this embodiment, the side plates are defined by left and right frames 2a and 2b constituting frame bodies on which various members are supported, as well as left and right outer side plates (cover bodies) 3a and 3b which are respectively fitted to these left and right frames 2a and 2b with a predetermined space therebetween. For this reason, for example, a driving-force transmitting mechanism, the clutch mechanism, a backlash preventing mechanism, and the like are adapted to be mounted in the internal spaces each formed between each of the left and right frames and each of the left and right outer side plates. It should be noted that the shapes of the frames and the outer side plates may be appropriately modified, and materials for constituting them are not restricted. In addition, as for the method of fitting the outer side plate to the frame and the mounting position thereof, it is possible to use various methods and positions in accordance with the structure and the like of the reel body.

The aforementioned left and right frames 2a and 2b are integrated via a plurality of columns, and a reel leg 6 which is mounted on a reel seat of a fishing rod is provided on a lower column thereof. Further, a spool shaft 5a is rotatably supported between the left and right frames 2a and 2b by means of bearings, and the aforementioned spool 5 is mounted on this spool shaft 5a. It should be noted that the bearings which rotatably support the spool shaft 5a may be disposed on frame portions, or may be disposed on outer side plate portions.

The spool 5 is rotated as a handle 8 mounted on the right side plate 2B of the reel body 1 is rotationally operated. The handle 8 is fixed to an end portion of a handle shaft 8a projecting from the right outer side plate 3b, and is rotatable in only the line winding direction by means of a reversing preventing mechanism (rolling type one-way clutch) interposed between the handle shaft 8a and the right outer side plate 3b.

The following are accommodated between the right frame 2b and the right outer side plate 3b: a driving force transmitting mechanism 10 for transmitting the rotational motion of the handle 8 to the spool shaft 5a and a threaded shaft 21 of a fishing line guiding device 20 which will be described later, a clutch mechanism 50 for engaging or disengaging the transmission of the driving force, a drag mechanism for imparting a drag force to the spool 5 when the fishing line is paid out from the spool 5 when catching a fish, and the like.

As is known, the aforementioned driving force transmitting mechanism 10 has a drive gear 11 which is rotatably supported by the handle shaft 8a and a pinion 12 meshing with this drive gear 11. The pinion 12 is mounted coaxially with the spool shaft 5a and is axially movable along a pinion shaft 12a. Further, a circumferential groove is formed on an outer periphery of the pinion, and a yoke 57 of the clutch mechanism 50, which will be described later, is engaged with this circumferential groove so as to axially move the pinion 12. Namely, as the pinion 12 is axially moved, the pinion 12 is engaged with or disengaged from the spool shaft 5a to thereby effect a changeover between a power transmitted state (clutch ON) and a power cutoff state (clutch OFF).

The fishing line guiding device 20 is disposed between the left and right side plates of the spool 5. This fishing line guiding device 20 has the treaded shaft 21 which is rotatably supported between the left and right side plates and is rotatably driven by means of the aforementioned driving force transmitting mechanism 10. An input gear 11a is provided on the aforementioned handle shaft 8a in such a manner as to be located adjacent to the drive gear 11, and a gear 21a mounted at an end portion of the threaded shaft 21 meshes with this input gear 11a.

The fishing line guiding device 20 has a slider body 22 which is mounted between the left and right side plates on the front side of the spool 5 and is reciprocated left and right by the winding operation of the handle 8. The slider body 22 is held in such a manner as to be prevented from rotating with respect to a guide shaft 23 which is supported between the left and right side plates so as to be parallel to the aforementioned threaded shaft 21.

A spiral groove 21b is formed on an outer peripheral surface of the threaded shaft 21, and the threaded shaft 21 is accommodated in a tubular body 25 mounted between the left and right side plates. An elongated hole 25a extending in the axial direction is formed in the tubular body 25, and partially exposes the spiral groove 21b along the axial direction. In addition, the slider body 22 is disposed and formed so as to surround the tubular body 25, and retains therein a slider 26 which engages with the spiral groove 21b through the elongated hole 25a. It should be noted that the slider 26 is fixed to the slider body 22 by means of a cap nut 26a.

As a result, as the threaded shaft 21 is rotatively driven by the input gear 11a, the slider body 22 is reciprocated left and right along the guide shaft 23 by means of the slider 26 which engages the spiral groove 21b.

In addition, the fishing line guiding device 20 has a swinging body 30 provided with a line guide 32 whereby the fishing line is guided.

The swinging body 30 is formed in the shape of a plate, and one end portion thereof is rotatably supported on the lower side of the spool 5 of the reel body 1 by means of a supporting portion 31. Specifically, as shown in FIG. 3, the swinging body 30 is rotatably supported by means of the supporting portion 31 on the obverse surface side of the reel leg 6, preferably at a position on a side located forwardly of the spool shaft 5a. In this case, the supporting portion 31 is constituted by an externally threaded member for rotatably fixing the swinging body 30 to the reel leg 6.

The swinging body 30 has an extending portion 30a extending substantially horizontally toward the front side and a bent portion 30b formed by being bent at a distal end of the extending portion 30a toward the upper side. The aforementioned line guide 32 is provided at an upper end of that bent portion 30b. In this case, the line guide 32 maybe formed integrally with the swinging body 30, as shown in the drawings, or may be constructed as a separate member to be integrated with the swinging body 30.

A coupling portion 30c projecting downward is formed on a lower surface (lower surface of the line guide 32) of the bent portion 30b of the swinging body 30. This coupling portion 30c is engaged with an elongated hole 22a formed in the slider body 22. Namely, the swinging body 30 and the slider body 22 are in a coupled state by means of the coupling portion 30c, such that when the slider body 22 is reciprocated left and right, as described above, a distal end side (line guide side) of the swinging body 30 is adapted to swing arcuately about the supporting portion 31 as a center of rotation.

The line guide 32 has a frame structure, and is formed substantially in a V-shape in a front elevational view, as shown in FIG. 4. Namely, the line guide 32 has a line guide portion 32a whose upper side is open and through which the fishing line is passed, as well as engaging portions 32c and 32d which respectively extend from both upper outer sides of the line guide portion 32a and whose respective distal ends are movably engaged with the left and right side plates 2A and 2B.

As shown in FIG. 3, the line guide portion 32a is raised up so as to be tilted toward the rear side in a side elevational view, and upper ends of the line guide portion 32a are formed as guide portions 32e and 32f (having the function of guiding the fishing line to the line guide portion 32a) which are tilted so as to gradually expand toward the rear. Further, the aforementioned engaging portions 32c and 32d are respectively formed at distal ends of the guide portions 32e and 32f.

In addition, elongated grooves 2c and 2d, which extend along the line releasing direction and with which the left and right engaging portions 32c and 32d of the line guide 32 are respectively engaged, are respectively formed on the inner sides of the left and right side plates (left and right frames 2a and 2b) of the reel body 1. In this case, when the swinging body 30 is swung arcuately about the supporting portion 31 as the center of rotation, as described above, the left and right engaging portions 32c and 32d which are respectively engaged with the elongated grooves 2c and 2d move in mutually opposite directions. Namely, when the left engaging portion 32c moves toward the rear side, as shown in FIG. 7, the right engaging portion 32d moves toward the front side, and when the left engaging portion 32c conversely moves toward the front side, the right engaging portion 32d moves toward the rear side. Thus, the line guide portion 32a of the line guide 32 is adapted to swing arcuately from side to side.

The aforementioned clutch mechanism 50 has a clutch driving member 51 which is rotatably supported along the right frame 2b as well as a clutch changeover member (hereafter referred to as the changeover member) 52 for driving this clutch driving member 51

The changeover member 52 in accordance with this embodiment has a disengagement operation portion 53 disposed on the rear side of the spool 5 so as to laterally bridge the left and right side plates 2A and 2B in order to effect a changeover operation of the clutch mechanism 50 from the ON state to the OFF state and an engagement operation portion 54 disposed over the left and right side plates 2A and 2B in order to effect a changeover operation of the clutch mechanism 50 from the OFF state to the ON state. The disengagement operation portion 53 and the engagement operation portion 54 are integrally coupled to each other.

In this case, the changeover member 52 is rotatably supported with respect to the reel body 1 (left and right side plates 2A and 2B). The arrangement provided is such that the pressing operation (clutch OFF operation) of the disengagement operation portion 53 disposed on the rear side of the spool 5 causes the engagement operation portion 54 to rotate to open the upper side of the line guide 32 (see FIG. 5), whereas the pressing operation (clutch ON operation) of the engagement operation portion 54 causes the disengagement operation portion 53 to be raised to return to the state shown in FIG. 3.

Specifically, as shown in FIG. 1, the engagement operation portion 54 for constituting the changeover member 52 has such a shape that its both sides cover upper surfaces of the left and right side plates 2A and 2B while exposing the spool 5, and its front side laterally bridges the left and right side plates 2A and 2B. Namely, the engagement operation portion 54 is for effecting a changeover operation of the clutch mechanism 50 in the OFF state to the ON state, and is constructed openably while covering a wide range on the upper surface sides of the left and right side plates 2A and 2B of the reel body 1, such that the changeover operation can be performed easily with a finger of the hand on the side gripping and holding the reel body 1 together with the fishing rod, or the changeover operation can be performed with such a simple operation as to put the opposite hand on the reel body 1.

By virtue of the above-described structure, the line guide 32 of the fishing line guiding device 20 in a top view (see FIG. 1) is in a state in which at least the guide portions 32e and 32f and a portion of the line guide portion 32a are covered by the engagement operation portion 54.

As is known, the aforementioned clutch driving member 51 is rotatably supported by the right frame 2b, and is held in such a manner as to be distributed between the power transmitted state (clutch ON state) shown in FIG. 3 and the power cutoff state (clutch OFF state) shown in FIG. 5 by means of a distribution spring 56. In addition, a pair of cam surfaces 58, which are capable of engaging a yoke 57 fitted in the circumferential groove of the pinion 12, are formed on the surface of the clutch driving member 51.

Distal end sides of the yoke 57 are supported by supporting pins 59 provided projectingly on the right frame 2b, and the yoke 57 is set in a state of being constantly urged toward the clutch driving member 51 side by spring members (not shown) disposed on the respective supporting pins 59. It should be noted that FIG. 3 shows a state in which the yoke 57 is urged toward the clutch driving member 51 side by the spring members. At this time, the pinion 12 is engaged with an engaging portion formed at an end portion of the spool shaft 5a and is thereby set in the clutch ON state.

An end portion of the clutch driving member 51 is coupled to the aforementioned disengagement operation portion 53, so that when the disengagement operation portion 53 is pressingly operated, the clutch driving member 51 is rotated in the counterclockwise direction to disengage the pinion 12 from the engaging portion formed at the end portion of the spool shaft 5a by means of the yoke 57 (to change over to the clutch OFF state). In addition, this state is held by the aforementioned distribution spring 56, and the engagement operation portion 54 rotates, as described above, so that the upper side of the line guide portion 32a of the line guide 32 is opened, as shown in FIGS. 5 and 6.

Meanwhile, as the engagement operation portion 54 is pressingly operated, the clutch driving member 51 is rotated in the clockwise direction in the opposite procedure to that described above to thereby return to the clutch ON state.

Its should be noted that the clutch mechanism 50 constructed as described above is provided with a known clutch automatic reset mechanism 60 for automatically returning the clutch driving member 51 to the position of the clutch ON state when the winding operation of the handle 8 is performed in the clutch OFF state.

Next, a description will be given of the operation and effect of the fishing reel constructed as described above.

In the clutch ON state shown in FIGS. 1 to 4, if the disengagement operation portion 53 of the changeover member 52 located on the rear side of the spool 5 is pressingly operated, the clutch driving member 51 is rotated counterclockwise and is held in the state shown in FIG. 5 by the distribution spring 56. At this time, the cam surfaces formed on the surface of the clutch driving member 51 shift the yoke 57 in the axial direction to thereby disengage the pinion 12 from the spool shaft 5a (clutch OFF state). In addition, the pressing operation of the disengagement operation portion 53 causes the front side of the engagement operation portion 54 of the changeover member to rotate so as to rise from the left and right side plates 2A and 2B, so that the upper side of the line guide portion 32a of the line guide 32 is opened.

In this state, the spool 5 is a freely rotatable state, and the fishing line is released by a casting operation or the like. In this case, the fishing line tends to bulge upward from the dotted line S to the dotted line S', as shown in FIG. 5. However, since the upper side of the line guide portion 32a is in the open state, as described above, the fishing line is not subjected to contact resistance by other objects, so that the casting distance of the line is not decreased.

It should be noted that a member (line contact member) 54A, which is wear resistant and has small sliding resistance, is preferably attached to the rear surface of the engagement operation portion 54. By thus attaching the line contact member 54A, even if the fishing line comes into contact with the back side of the engagement operation portion 54, it is possible to prevent the fishing line from being broken and further reduce the contact resistance.

Further, as a finger (mainly the thumb performing the thumbing operation) of the hand gripping and holding the reel body 1 together with the fishing rod is slightly shifted forward or sideways to press the engagement operation portion 54 downward, the clutch driving member 51 is rotated clockwise from the state shown in FIG. 5, and is reset to the clutch ON state by the distribution spring 56. It should be noted that the resetting to the clutch ON state is also possible by means of the aforementioned clutch automatic reset mechanism 60 by performing the winding operation of the handle 8.

Subsequently, as the winding operation of the handle 8 is performed, the fishing line is wound in parallel to the spool 5 by the line guide 32 of the fishing line guiding device 20.

In this case, as the winding operation of the handle 8 is performed, the threaded shaft 21 of the above-described fishing line guiding device 20 is rotatively driven by means of the input gear 11a provided on the handle shaft 8a and the gear 21a meshing therewith.

As the aforementioned threaded shaft 21 is rotatively driven, the slider body 22 is reciprocated left and right along the guide shaft 23 by means of the slider 26 engaged with the spiral groove 21b formed on the outer peripheral surface of the threaded shaft 21. In conjunction with this, as for the swinging body 30 provided with the line guide 32, as the slider body 22 is reciprocated left and right, the front side of the swinging body 30 is swung arcuately about the supporting portion 31, which is supported on the lower side of the spool 5 of the reel body 1, by means of the elongated hole 22a formed in the slider body 22 and the coupling portion 30c engaged therewith.

At this time, the engaging portions 32c and 32d of the line guide 32 extending from the both upper outer sides of the line guide portion 32a whose upper side is open move in mutually opposite directions within the elongated grooves 2c and 2d respectively formed in the left and right frames 2a and 2b. Namely, when the line guide portion 32a of the line guide 32 has swung arcuately left and right, since the engaging portions 32c and 32d are supported so as to be able to move in the mutually opposite directions in the front-back direction, the line guide portion 32a can be stably swung arcuately left and right.

Figure 8:
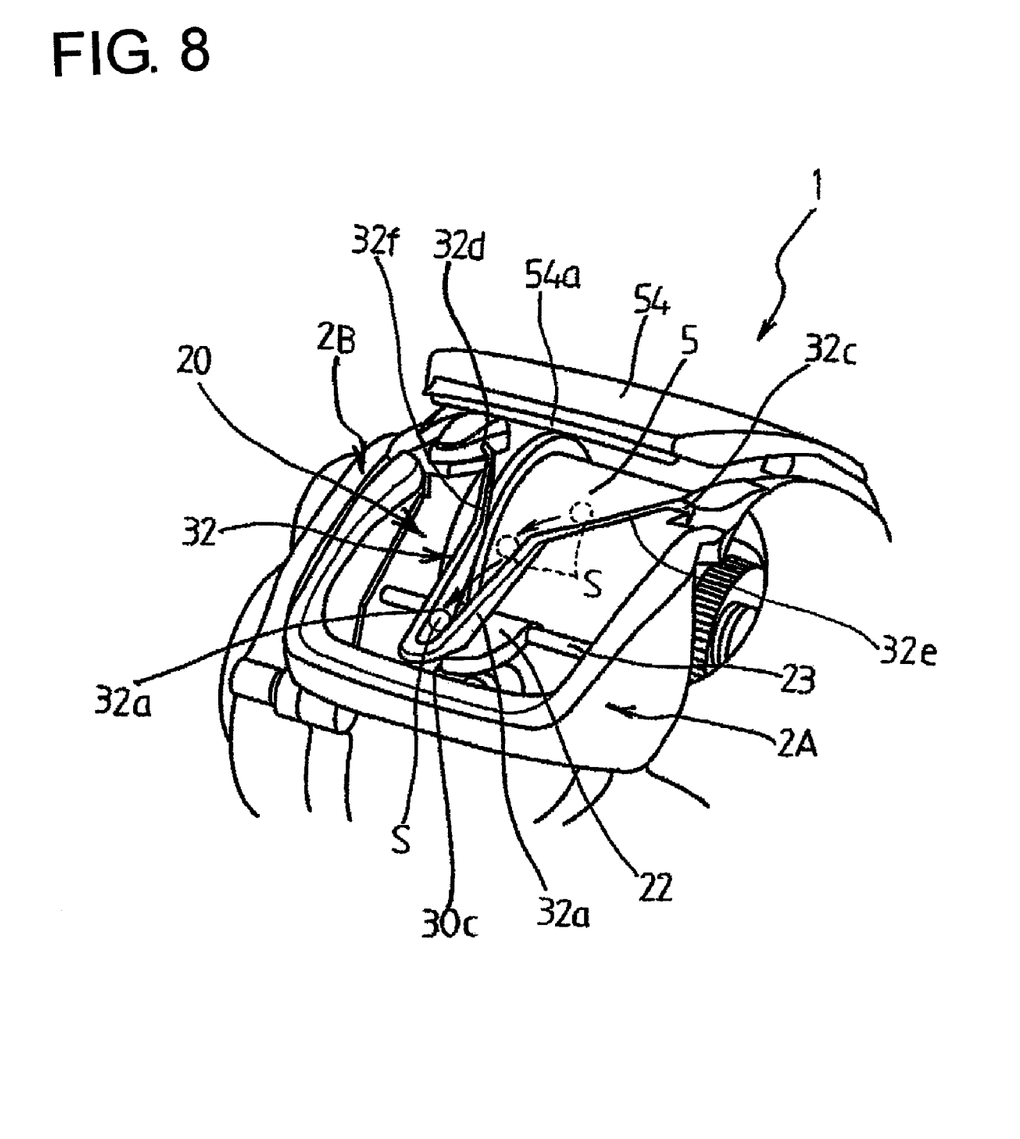
FIG. 8 is a perspective view of the reel body.

As a result, the fishing line enters the line guide portion 32a of the line guide 32 and is wound in parallel to the spool 5. It should be noted that even if the fishing line has slightly slackened or moved with respect to the spool 5, the fishing line is guided toward the line guide portion 32a by the guide portions 32e and 32f which are tilted so as to gradually expand toward the rear as shown in FIG. 8.

According to the fishing line guiding device 20 constructed as described above, since the slider body 22 which is reciprocated between the left and right side plates and the line guide 32 for guiding the fishing line are disposed on the front side of the spool 5, it becomes possible to make effective use of the space between the side plates in the rear of the spool as a zone for the clutch changeover operation and a thumbing zone such as by setting that space as an area for mounting the disengagement operation portion 53. Hence, it becomes possible to improve the operability at the time of releasing the fishing line. In addition, since the structure provided is not such that the line guide 32 and the slider body 22 are distributed to the front and the rear of the spool 5, it becomes possible to attain a reduction in size of the reel body 1.

In this case, as the supporting portion 31, which constitutes a rotational proximal end portion of the swinging body 30, is mounted forwardly of the spool shaft 5a, it becomes possible to further miniaturize the reel body 1 in the vertical direction.

In addition, in the above-described structure, since the upper side of the line guide portion 32a of the line guide 32 has an opening (does not have a surrounded shape), the contact resistance is alleviated during the releasing of the fishing line, and the casting distance is not decreased. In particular, in this embodiment, as for the upper side of the line guide portion 32a, the portion which functions as a thumb rest (engagement operation portion 54) rotates during the clutch OFF to widely open the upper side of the line guide portion 32a, so that the possibility of the fishing line coming into contact with it becomes lower, thereby making it possible to prevent the decrease of the casting distance of the line more effectively.

In addition, in this embodiment, since the engaging portions 32c and 32d of the line guide 32 are supported so as to move in the mutually opposite directions within the elongated grooves 2c and 2d respectively formed in the left and right frames 2a and 2b, the line guide portion 32a can be stably swung arcuately from side to side. Further, by virtue of such an engaging method, the thickness of the left and right side plates 2A and 2B can be made thin as practically as possible, thereby making it possible to miniaturize the reel body 1.

Furthermore, since the line guide 32 is so shaped that the line guide portion 32a and the guide portions 32e and 32f are tilted toward the rear, it becomes possible to further miniaturize the reel body 1 in the vertical direction.

Figure 9:
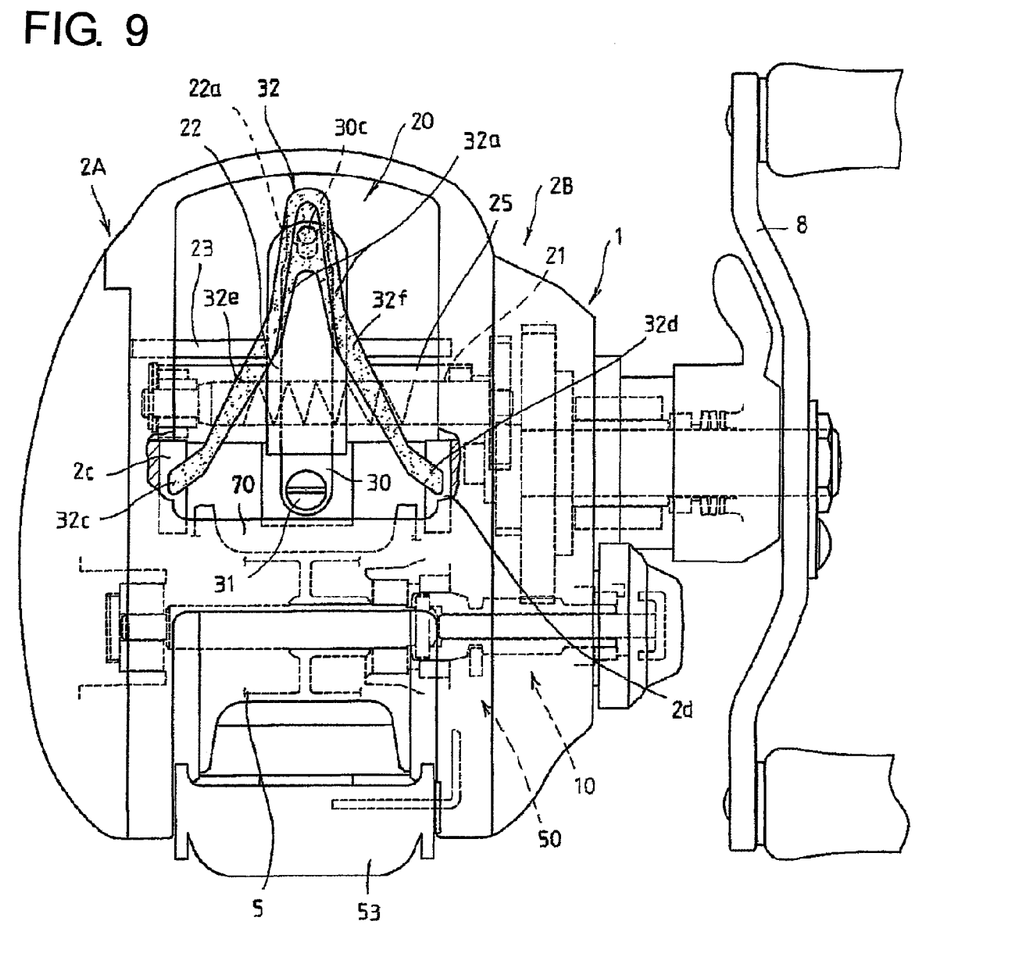
FIG. 9 is a plan view illustrating a second embodiment of the invention.

FIG. 9 is a plan view illustrating a second embodiment of the invention.

Although in the above-described embodiment the engagement operation portion 54 of the clutch mechanism is rotatably supported so that the upper side of the line guide portion 32a of the line guide 32 is opened during the releasing of the fishing line, a structure may be adopted in which an ordinary thumb rest 70 is mounted between the left and right side plates without mounting such an engagement operation portion 54.

Even in such a structure, since the slider body 22 and the line guide 32 are disposed on the front side of the spool 5, it becomes possible to attain a reduction in size of the reel body 1 and attain improvement of the line releasing operability. Additionally, as the upper side of the line guide portion 32a is made open in the same way as in the above-described embodiment, it becomes possible to alleviate the contact resistance and improve the casting distance.

Although a description has been given of the embodiments of the invention, the invention is not limited to the above-described embodiments, and various modifications are possible. Although in the above-described embodiments the line guide 32 is so shaped as to be tilted toward the rear, the line guide 32 may be formed so as to rise up vertically. In addition, the shape of the swinging body 30 and the method of engagement of the slider body 22 may be modified, as required.

What is claimed is:

1. A fishing reel comprising:
    a reel body including left and right side plates;
    a spool for winding a fishing line, rotatably supported between the left and right side plates;
    a handle for rotating the spool;
    a clutch mechanism which transmits rotation power of the handle to the spool;
    a clutch changeover member which is integrally formed with a disengagement operation portion for disengaging the clutch mechanism from the spool, and an engagement operation portion for engaging the clutch mechanism with the spool; and
    a fishing line guiding device which guides the fishing line to be wound on the spool,
    wherein the engagement operation portion bridges the left and right side plates, covers upper surfaces of the left and right side plates, and is movably supported by the reel body, and
    wherein the engagement operation portion covers at least a part of the fishing line guiding device.

2. The fishing reel according to claim 1, wherein
    the clutch changeover member is disposed along the upper surfaces of the left and right side plates, and
    the clutch changeover member is rotatably supported by the reel body so that an operating direction of the engagement operation portion is opposite to an operating direction of the disengagement operation portion.

3. The fishing reel according to claim 1, wherein the fishing line guiding device includes a swinging body including one end portion rotatably supported by the reel body and the other end provided with a line guide for guiding the fishing line.

4. The fishing reel according to claim 3, wherein:
    the spool is rotatable on a spool shaft, the disengagement operation portion is located rearwardly of the spool shaft, and the one end portion of the swinging body is rotatably supported by the reel body at a location forwardly of the spool shaft.

5. The fishing reel according to claim 3, wherein:
    the line guide includes a v-shaped line guide portion having an upwardly-facing opening, the clutch changeover member moves between an ON state and an OFF state, the engagement operation portion of the clutch changeover portion covers a portion of the line guide portion when the clutch changeover member is in the ON state, and
    the engagement operation portion of the clutch changeover portion does not cover the portion of the line guide when the clutch changeover member is in the OFF state.

* * * * *